Sept. 11, 1923.                                              1,467,585
                      J. C. MITCHELL
               JOINT FOR CONCRETE PRESSURE PIPES
                 Filed April 18, 1922       2 Sheets-Sheet 1
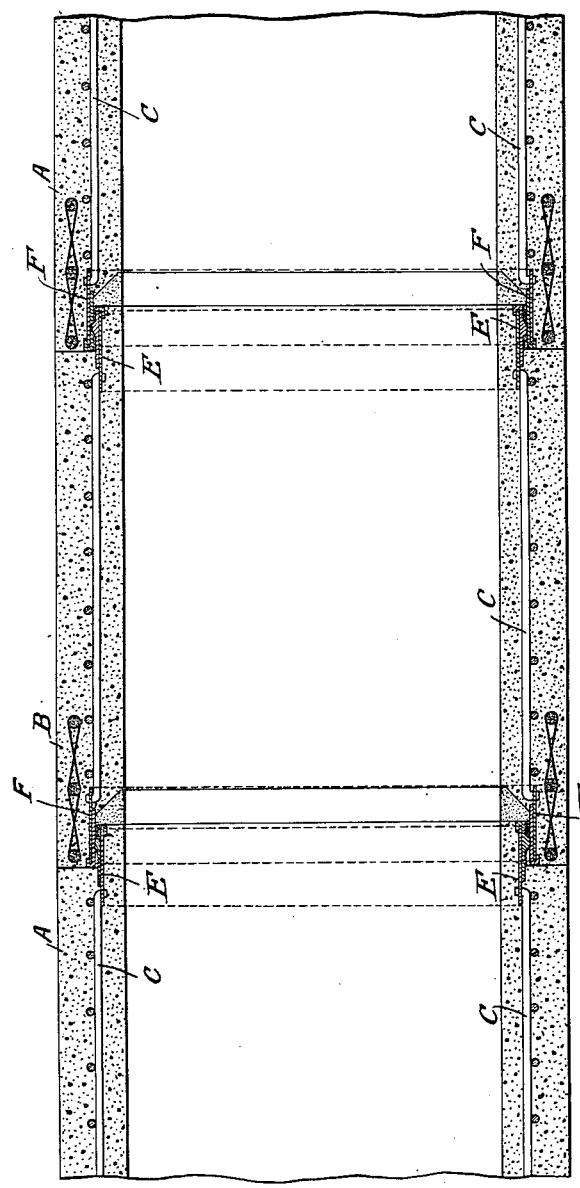
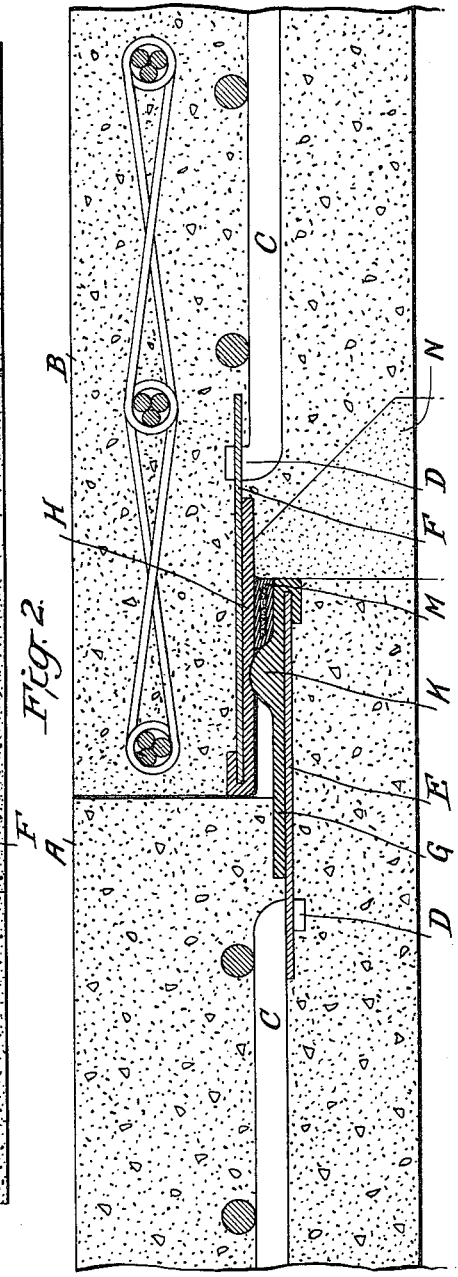
INVENTOR
John C. Mitchell
BY Cooper, Kerr & Dunham
                    ATTORNEYS.

Sept. 11, 1923.  1,467,585
J. C. MITCHELL
JOINT FOR CONCRETE PRESSURE PIPES
Filed April 18, 1922   2 Sheets-Sheet 2
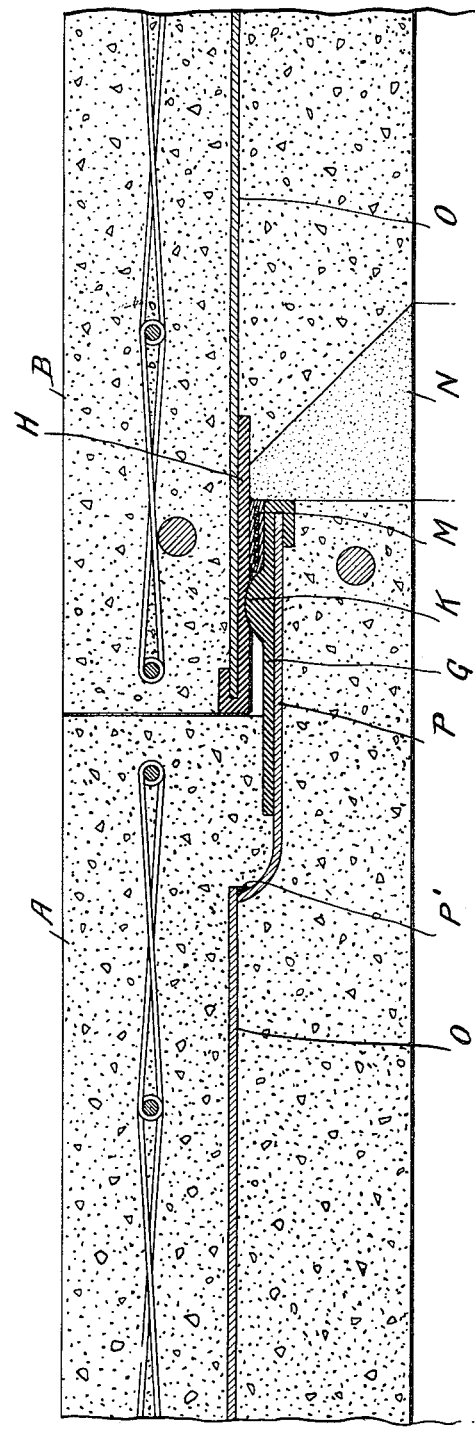
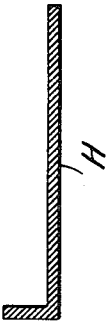
INVENTOR
John C. Mitchell
BY Cooper, Kerr & Dunham
ATTORNEYS Patented Sept. 11, 1923.

1,467,585

UNITED STATES PATENT OFFICE.

JOHN C. MITCHELL, OF EAST ORANGE, NEW JERSEY, ASSIGNOR TO LOCK JOINT PIPE COMPANY, OF AMPERE, NEW JERSEY, A CORPORATION OF NEW JERSEY.

JOINT FOR CONCRETE PRESSURE PIPES.

Application filed April 18, 1922. Serial No. 554,505.

*To all whom it may concern:*

Be it known that I, JOHN C. MITCHELL, a citizen of the United States of America, residing at East Orange, in the county of Essex and State of New Jersey, have invented certain new and useful Improvements in Joints for Concrete Pressure Pipes, of which the following is a full, clear, and exact description.

The invention for which I now seek by this application protection by Letters Patent is an improvement in joints for reinforced concrete pressure pipes. The primary object of the improvement is to secure a durable, cheap and perfectly tight joint for pipes of this character for which purpose I have devised a joint having the following general characteristics.

The concrete pipes are reinforced by steel rods or wires as is usually done, and each section of my improved pipe contains two or more longitudinal steel rods, running for practically their entire length. At the ends of each section a relatively short steel cylinder is secured to the ends of the longitudinal reinforcing rods, the cylinder at one end being of somewhat smaller diameter than that at the other, so that when sections are joined the cylinder in one will pass freely into that in the abutting end.

Into the end of the cylinder of larger diameter is passed a premolded cylinder of relatively heavy sheet lead, or a flat sheet of lead may be applied to the inner surface, and its free edges then turned back over the end of the steel cylinder by means of any suitable tool.

Over the end of the cylinder of smaller diameter is passed a similarly premolded sheet lead cylinder, the edges of which are turned back over the end of the steel cylinder, and this lead cylinder or sheet is formed with a projecting ridge, the external diameter of which is slightly greater than the internal diameter of the lead cylinder on the other or abutting end of the section.

When the reinforcements have been thus constructed and assembled, they are placed in a mold of known design, which is filled with concrete to form the pipes. The ends of the sections containing the steel cylinders of larger diameter and which constitute the bell ends, are squared off on the outside even with the lead covered ends of such cylinder, while inside the cylinder the end is beveled off near the inner end of the same, leaving most of the inner lead surface exposed. The other or spigot ends, however, are so formed that the concrete is squared off inside the lead covered cylinders at a point just beyond the inner end of the lead, while on the inside side the end of the section is squared off with the end of the lead covered cylinder.

When these sections are assembled the spigot end is forced into the bell end until its squared end meets the outer squared end of the bell. In forcing the section into place the lead projecting ridge on the spigot end is sheared by sliding over the lead covering of the bell end, thus making a tight and even fit and joint. To still further insure a good joint the space between the projecting ridge and the end of the bell and cylinder is packed with a soft lead filling which is firmly tamped, and the space between the beveled bell and squared spigot ends is then filled with fine concrete, cement or the like, to complete the pipe.

In this way a joint is formed by two telescoping steel cylinders the space between which is filled tightly with lead partly molded and in very intimate contact and partly tamped, but the arrangement is such that no part of the iron or steel reinforcements or cylinders is ever exposed to water which might circulate between the two faces of the joint, and which it is very desirable to prevent. Thus a most durable as well as strong and perfectly tight joint is obtained. This specific form may be modified as hereinafter indicated, but the above described construction embodies the principle of my improved joint.

The improved pipe joint is illustrated in the accompanying drawings.

Fig. 1 is a longitudinal section of two abutting pipe sections embodying my improvements.

Fig. 2 is a sectional view, on an enlarged scale, of a part of the joint.

Fig. 3 is a similar view of a modification of the same; and,

Figs. 4 and 5 are detailed views of the lead coverings or coatings used with the iron or steel cylinders.

The method or process of making the pipes is or may be any one of those now well known in the art, and in general consists in filling with concrete a mold in which the assembled metal reinforcements are supported. The drawings show the pipe sections in finished form.

A is the concrete portion of one pipe section and B that of another. Through these sections extend the longitudinal rods C, the ends of which are bent back at right angles near the ends of the concrete sections, as shown at D. Steel cylinders E, F, are secured to the rods C by means of perforations through which the bent ends extend, and the number of the rods C is not of the essence of the invention, as there may be two or more of them, if so desired, or other forms of reinforcement may be employed.

Before the reinforcements are assembled, lead coverings or coatings G, H, which are, preferably, premolded, although they may be made and applied in any way, are associated with the steel cylinders. The lead sheet or cylinder G being slipped into the larger steel cylinder E and sheet H being slipped over the end of cylinder F, the free ends of the leads extending slightly beyond the ends of the steel cylinders, and then by means of any suitable tool these ends are turned back over the said cylinders as shown at L.

The lead H has plain surface, while the lead G is molded with a circular raised portion or ridge K, the external diameter of which is slightly less than the internal diameter of the lead cylinder H, so that when two sections are assembled and the spigot end of one forced into the bell and of the other, the top of the ridge will be sheared off, and a tight fit thereby secured.

After the sections of pipe have been thus assembled, the space between the lead coating between the ridge K and the end of the bell is filled with a lead packing consisting, preferably, of a lead gasket M, filled with a compressible material and this packing is firmly tamped in. The space around the joint is then filled in with cement N or other suitable material to complete the pipe.

Instead of using longitudinal reinforcing rods C for these pipes, it is common practice to use continuous iron or steel tubes or cylinders O, Fig. 3, embedded in the concrete. When this is done the form of joint above described is modified somewhat. The cylinders in all the sections are of the same diameter, and the projecting cylinder at the bell end is covered on the inside with a lead sheet or cylinder, as before. The continuous cylinder in the spigot end, however, does not extend to the end of the section, but a separate cylinder P of smaller diameter is bent out or otherwise formed to fit into its end, and is then welded to the main cylinder, as at P in Fig. 3. Otherwise, the construction is the same as that above set forth.

This constitutes a most durable and permanently tight joint for concrete pipes designed to withstand high internal pressure. The character of the joint is such that its integrity is preserved despite relative movement of two adjacent sections due to subsidence or expansion and contraction. The pipe, therefore, may be made in various forms, and in various ways, and within certain manifestly permissible limits the joint itself may be varied without departure from the invention.

The features upon which the value and importance of the improvement chiefly depend, which referred to generally alone, may be more particularly enumerated. First, all metal used in the construction of the pipes is protected by a non-corrosive material at all points when there can possibly exist any circulation of water, and this effectually prevents rusting. Second, and this is more especially true of pipes of large size, the opportunity to backfill the pipe will allow it to assume its final position of settlement before the joints are finally caulked tight. Third, it permits the placing of the gasket and the caulking in such position as to make it impossible to blow it out by internal water or other pressure. In fact, the higher the internal pressure, the tighter the joint. Finally, the ability to complete the joint entirely from the inside of the pipe avoids the troubles and ditch conditions ordinarily existing.

What I claim is:—

1. A joint for concrete pressure pipes comprising in combination, metal cylinders integrally molded into the ends of abutting sections, and of diameters which permit the cylinders of two abutting sections to telescope, non-corrosive coatings or coverings of relatively soft material over the opposing surfaces of said cylinders, and a ridge or raised portion on one of said coatings of such relative diameter as to be sheared in passing over the other when the ends of two sections are forced together.

2. A joint for concrete pressure pipes comprising in combination, metal cylinders integrally molded into the ends of abutting sections, and of diameters which permit the clyinders of two abutting sections to telescope, lead coatings or coverings over the opposing surfaces and ends of said cylinders, and a ridge or raised portion on one of said coatings of such relative diameter as to be sheared in passing over the other when the ends of two sections are forced together.

3. A joint for concrete pressure pipes comprising in combination, metal cylinders integrally molded into the ends of abutting sections and of diameters which permit the cylinders of abutting sections to telescope, lead coatings or coverings over the opposing surfaces and ends of said cylinders, a ridge or raised portion on one of said coatings and of a diameter to be sheared by passing over the other coating when two sections are joined, and a lead packing in the spaces between the two coatings between said ridge and the end of the pipe section.

4. A joint for concrete pressure pipes comprising in combination, metal cylinders in the ends of each section united by steel reinforcing material and of diameters that permit the cylinders of abutting sections to telescope when the sections of pipe are joined by forcing the end of one into the other, lead coatings covering the contiguous surfaces and the ends of the said cylinders, one of the coatings of each telescoping pair being formed with a raised portion at a given point that is sheared by sliding contacts with the surface of the other, when two pipe sections are telescoped and forced together.

5. A joint for concrete pressure pipes comprising in combination, steel cylinders at the ends of each section of pipe, of diameters which permit the cylinders of two abutting pipe sections to telescope, longitudinal reinforcements connecting the cylinders of each section, lead coatings or coverings over the outer surface and end of the cylinder of smaller diameter and over the inner surface and end of the cylinder of larger diameter, an annular ridge or raised portion on one of said lead coatings of such diameter that it is sheared in sliding over the surface of the other when two pipe sections are forced together.

6. A joint for concrete pipes comprising in combination, short steel cylinders embedded at the ends of each section and of unequal diameters so as to telescope, steel reinforcing rods extending longitudinally through the concrete body of the pipe sections and connecting the end cylinders together, lead coatings or coverings on the contiguous surfaces of the cylinders and over the free ends of the same, one coating of each telescoping pair having a raised portion at a given point that is sheared by sliding contact with the surface of the other when two pipe sections are telescoped and forced together, thereby making a tight joint between the two sections.

7. A joint for concrete pressure pipes comprising in combination, short steel cylinders embedded in the ends of each section and of different diameters, longitudinal reinforcing rods connecting together the cylinders of each pipe section, lead coatings or coverings for the opposing surfaces and ends of each cylinder, the cylinders of smaller diameter having an annular ridge or raised portion of such diameter as to be sheared when two pipe sections are forced together, and a lead packing between the lead coatings in the space between said ridge and the end of the pipe section.

8. A joint for concrete pressure pipes comprising in combination, metal cylinders integrally molded into abutting sections and forming the opposing surfaces of the joint between two sections, and coatings of non-corrosive material covering all parts of the surfaces of such cylinders which are not embedded in the concrete.

In testimony whereof I hereto affix my signature.

JOHN C. MITCHELL.